United States Patent
Rodriguez (10) Patent No.: US 8,922,129 B1
(45) Date of Patent: Dec. 30, 2014

(54) DIMMABLE LED DRIVER AND METHODS WITH IMPROVED SUPPLEMENTAL LOADING

(75) Inventor: Edward Rodriguez, Wakefield, MA (US)

(73) Assignee: Solais Lighting, Inc., Stamford, CT (US)

( * ) Notice: Subject to any disclaimer, the term of this patent is extended or adjusted under 35 U.S.C. 154(b) by 107 days.

(21) Appl. No.: 12/831,219

(22) Filed: Jul. 6, 2010

Related U.S. Application Data (60) Provisional application No. 61/270,315, filed on Jul. 6, 2009.

(51) Int. Cl.
*H05B 37/02* (2006.01)
*H05B 39/04* (2006.01)

(52) U.S. Cl.
USPC ......... 315/224; 315/307; 315/291; 315/200 R (58) Field of Classification Search
CPC ............... H05B 33/0809; H05B 37/02; H05B 33/0815; H05B 33/0824; H05B 33/0842; H05B 33/0839; H05B 33/089; H05B 33/0812; H05B 33/0821; H05B 39/044
USPC ...................................... 315/291, 209, 200 R
See application file for complete search history.

(56) References Cited

U.S. PATENT DOCUMENTS

| | | | |
|---|---|---|---|
| 6,781,351 B2 * | 8/2004 | Mednik et al. | 323/222 |
| 6,940,733 B2 * | 9/2005 | Schie et al. | 363/21.12 |
| 7,102,902 B1 * | 9/2006 | Brown et al. | 363/89 |
| 7,352,138 B2 * | 4/2008 | Lys et al. | 315/291 |
| 7,852,017 B1 * | 12/2010 | Melanson | 315/291 |
| 2009/0195168 A1 * | 8/2009 | Greenfeld | 315/192 |

* cited by examiner

*Primary Examiner* — Jimmy Vu
*Assistant Examiner* — Amy Yang
(74) *Attorney, Agent, or Firm* — Kristofer E. Elbing (57) ABSTRACT

In one general aspect, a dimmer power supply circuit is disclosed for use with single-pole dimmers that includes a first AC mains input line, second AC mains input line, and a rectification circuit responsive to the first and second AC mains input lines. A positive LED supply terminal responsive to the rectification circuit, and a negative LED supply terminal is responsive to the rectification circuit. At least one preload resistor is operatively connected in a first intermittent loading circuit path between two supply rails in the dimmer power supply circuit, and a peak detector is responsive to the first and second AC mains input lines. A first switching circuit includes a selectively enabled conduction path operatively connected in the first intermittent loading circuit path between the first and second supply rails and a control input that is responsive to the peak detector to selectively enable the switching element's conduction path when power detected across the first and second AC mains input lines is dimmed to below a predetermined level.

8 Claims, 6 Drawing Sheets

SMALL PHASE ANGLE NEAR FULL BRIGHTNESS

FIG. 5C

LARGE PHASE ANGLE (DIM SETTING)

FIG. 5D

DC LEVEL VARIES WITH DIMMER PHASE ANGLE

FIG. 5E

LOW RIPPLE DC LEVEL IS CONSTANT AND CLOSE TO POLE AC MAINS VOLTAGE

FIG. 5F

PRIOR ART

FIG. 6

PRIOR ART

DIMMABLE LED DRIVER AND METHODS WITH IMPROVED SUPPLEMENTAL LOADING

CROSS-REFERENCE TO RELATED APPLICATION

This application claims the benefit of U.S. provisional application No. 61/270,315 filed on Jul. 6, 2009, which is herein incorporated by reference.

FIELD OF THE INVENTION

This application relates to methods and apparatus used to dim Light Emitting Diodes (LEDs) in illumination applications, including dimming methods and circuits that provide improved supplemental loading when using LEDs with standard, AC-mains, single-pole, phase control dimmers.

BACKGROUND

There is considerable attention being given to the use of high brightness LED (HBLED) technology as a light source to replace traditional incandescent lamps. The catalyst for introduction of white LEDs, first as indicators, and later for viable commercial illumination sources, has primarily been due to development and refinement of blue-LED material-science processes, in conjunction with appropriate yellow-phosphor coatings for what is termed secondary emission. The science of secondary emission has been long understood by those skilled in lighting technology and such science has previously provided the basis for fluorescent and most other gaseous discharge lamps.

In such a process of secondary emission, monochromatic light, generated within a phosphor-coated LED chip, causes the phosphor to emit light of different wavelengths. This has resulted in white HBLEDs, with rating of up to a few watts and lumen outputs, depending on color temperature, exceeding 90-100 lumens per watt.

The mechanism is much like that in a gaseous discharge tube lamp where ultraviolet light excites the phosphor coating on the inside of an evacuated glass tube to create visible white light. Interestingly, many of the difficulties in refining the technology of white LEDs relate to the same issues experienced with gaseous discharge lamps in mastering phosphor composition and deposition processes to achieve consistency and desired performance.

The fundamentals of incandescent lamp design have changed little in the last 75 years. Similarly, the design and performance of fluorescent lamps have not changed substantially in the last 40 years. That is to say, both incandescent and fluorescent lamp processes are considered to be mature technologies, with very little gain in efficacy (i.e., lumens per watt) expected in the near future.

High brightness LED's, on the other hand, are experiencing some gain in efficacy each year as scientists refine techniques for light extraction from the chip and slowly master the composition and deposition of phosphors. When many of these factors are better understood in the future and efficacy is further improved (a projection accepted by most industry experts) the LED lamps will be far more easily accepted and many of the present challenges will be mitigated. Until that happens, however, there are compelling reasons to develop novel techniques to enhance what now exists so as to accelerate commercial viability.

Two factors are driving the substantial interest in white-emitting HBLEDs as a candidate to replace incandescent lamps in a large number of general illumination applications: longevity and energy conservation.

The typical white HBLED chip, generally rated from one to three watts, if used properly, is expected to have a useful operating life of over 50,000 hours, dramatically longer than the 750-2,000 hours of a typical incandescent lamp and much longer than the typical 6,000 hours of a compact fluorescent lamp. Readily available HBLEDs can exhibit efficacies of more than 90 lumens per watt, 6-10 times better than either a regular or quartz-halogen version of an incandescent lamp.

While there is significant saving in bulb replacement expense over a number of years, it is the saving in electricity costs which presents the most significant benefit. In conditions of near-continual operation, such as in restaurants, hotels, stores, museums, or other commercial installations, the electricity savings can provide a very favorable return on investment, even with relatively high purchase prices, in 18-24 months. The potential for rapid payback is generally much more evident than for other highly publicized "green" technologies" such as hybrid vehicles, wind turbines, solar power etc.

There is widespread acceptance that white-light LED sources are attractive as possible incandescent replacement lamps, especially in those types where the LED lamp is at its best, namely as reflector-type lamps such as PAR 30, PAR 38, or MR16. LEDs are by their nature directional light sources in that their light is emitted typically in a conical 120-150 degree beam angle, whereas an incandescent lamp tends to radiate in a near 360-degree spherical pattern and needs loss-inducing reflectors to direct light. Compact fluorescent lamps, because they are very difficult to collimate, are very inefficient when used as directional light sources.

The LED lamp starts out in a better position in spot or flood lamp applications because of its inherent directionality. In fixtures for ceiling downlighting, outside security, or retail merchandise highlighting, the need is for directional lighting, a factor taking advantage of the LED lamp's inherent emission characteristics. Those with a reasonable knowledge of physics know that a point source of light is best for use with a reflector or collimator. A CFL, being the virtual opposite of a point source, is poor in this respect. An incandescent filament is much smaller but still needs a good-sized reflector. An LED chip, being typically no larger than a millimeter on a side, lends itself to many more options with much smaller reflectors and collimating lenses.

Consequently, while white HBLEDs may alone, or as a partner with the compact fluorescent lamp (CFL), replace incandescent filament lamps, it is in the reflector lamps where the performance and economics of white LEDs appear likely to have the more immediate impact. While the CFL has become widely commercialized, the LED lamp does have certain advantages, which over the long term could give it a substantial marketing edge. Specifically, compared to a CFL, the LED lamp is a) more compatible with standard lamp dimming methodologies b) can more easily operate in low temperature, c) has no mercury content d) retains its efficacy when dimmed e) is essentially immune to shock and vibration and f) is immune to the degradation which CFL's experience with repetitive on/off cycling.

Even with the apparent advantages of the white HBLED lamp and its assumed inevitability as a commercially successful product category, there has yet to be an acknowledged product-leadership candidate; that is, a product which meets the performance and cost criteria necessary for early-adopter, sophisticated, commercial users to accept it on a large scale.

SUMMARY

In one general aspect, the invention features a dimmer power supply circuit for use with single-pole dimmers that includes a first AC mains input line, second AC mains input line, and a rectification circuit responsive to the first and second AC mains input lines. A positive LED supply terminal responsive to the rectification circuit, and a negative LED supply terminal is responsive to the rectification circuit. At least one preload resistor is operatively connected in a first intermittent loading circuit path between two supply rails in the dimmer power supply circuit, and a peak detector is responsive to the first and second AC mains input lines. A first switching circuit includes a selectively enabled conduction path operatively connected in the first intermittent loading circuit path between the first and second supply rails and a control input that is responsive to the peak detector to selectively enable the switching element's conduction path when power detected across the first and second AC mains input lines is dimmed to below a predetermined level.

In preferred embodiments, the circuit can further include a multi-cycle delay circuit having a control output provided to a switching element in the intermittent loading circuit path. The output of the multi-cycle delay circuit can be provided to the control input of the first switching element. The first switching element can be a MOSFET switch. The preload resistor can be an input preload resistor operatively connected between the first AC mains input line and the second AC mains input line. The preload resistor can be an output preload resistor operatively connected between the positive LED supply and the negative LED supply terminal. The circuit can further include at least one input preload resistor operatively connected in a second intermittent loading circuit path between the first AC mains input line and the second AC mains input line, and a second switching element including a selectively enabled conduction path operatively connected in the second intermittent loading circuit path between the first AC mains input line and the second AC mains input line and a control input that is responsive to the peak detector to selectively enable the switching element's conduction path. The circuit can further include a power conversion circuit operatively connected between the rectification circuit and the LED supply terminals. The power conversion circuit can include a buck regulator.

In another general aspect, the invention features a method of providing power to an LED that includes receiving AC power with a variable duty cycle, rectifying the AC power, providing the rectified power to an LED, and diverting power from the LED below a predetermined level of the duty cycle of the AC power.

In preferred embodiments the step of diverting power can indirectly load the AC power by loading the power provided to the LED. The step of diverting power can directly load the power provided to the LED. The method can further include the step of converting the rectified power using a power conversion circuit before providing it to the LED. The step of diverting power can take place intermittently during only a portion of each phase of the duty cycle.

Preferred embodiments of the invention can address what has been one of the major obstacles to high brightness LED lamp acceptance in installations where incandescent lamps have traditionally been used for general illumination. More specifically, these embodiments can provide a technological approach which allows LED lamps to be smoothly and fully dimmed by a standard, single-pole, phase-control dimmer without exhibiting certain undesirable properties which are known to be evident in existing art.

Solid state dimmers have been available since the late 1960's when a class of semiconductors known as thyristors became readily available. These devices exhibit a unique regenerative switching characteristic which allows them to be synchronized to the AC line and to be triggered into conduction predictably each half cycle. Until then, the only method to dim incandescent lamps was to reduce and divert power via a rheostat, a process which heated the rheostat as the lamp power was reduced. Needless to say, this technique was extraordinarily energy inefficient and generated so much heat in the dimmer that dimmers were generally not useful except in very special applications where size and heat were not issues.

The thyristor-based dimmer eliminated most of the power loss and resulted in the development of the popular wall dimmer. The basic design has not changed in over 40 years, with hundreds of millions of such dimmers sold globally for commercial and residential use. Today, virtually all dimmers use a form of thyristor known as a triac.

But LEDs are not easily compatible with traditional dimming practices. LEDs, unlike resistor-like incandescent filaments, are low-voltage-DC-only elements and cannot be powered directly from the AC mains. Instead, they require special power supply circuits to convert AC to DC and to lower the 120 volts to about 3 volts per LED. Those circuits, interacting undesirably with dimmer components and the nonlinear impedance of LEDs, virtually always result in unacceptable dimming performance.

Embodiments according to the invention, however, can be used with traditional dimming practices, which can allow them to be used with a huge installed base of traditional dimmers, as presented below.

DESCRIPTION OF ILLUSTRATIVE EMBODIMENTS

In preferred embodiments, the LEDs are powered by a high-frequency switching power-supply circuit, which converts the AC-mains voltage to an appropriate level of DC voltage and, more importantly, regulates the current through the LEDs in such a way that they will have the desired power level and light output. The control circuit incorporates provisions so that a decrease in the input AC RMS voltage by means of a standard, single-pole phase-control dimmer will result in a relatively proportional decrease in the RMS DC current through the LEDs, thereby decreasing their brightness.

Most commercial switching power supplies incorporate provisions to maintain a constant output voltage in the presence of AC line voltage variations. This normally desirable characteristic prevents such power supplies from allowing load power control (i.e. variable brightness) by means of a standard phase control lamp dimmer. Such power supply regulation circuitry, used perhaps in 99% of all switching power supply applications, works in an LED-dimming application to defeat the proper function of the dimmer.

More specifically, if a standard power supply were used to control an LED series string, the current and voltage for the LEDs would remain constant as the input voltage is reduced. At a certain point of voltage reduction, the power supply would typically cease to deliver power at all or would become erratic. Suffice it to say, then, that a regular power supply circuit is virtually non-dimmable to any acceptable degree.

Therefore, a first step in a dimmable power supply design can be to disengage any line voltage regulation aspect.

Therefore, the suggested embodiments herein purposely do not incorporate certain aspects of the normal regulation function so as to allow the dimmer to affect the LED power as desired. In other words, the power to, and brightness of, the LED lamp, just like the traditional incandescent lamp, is controlled so as to track the variations of the AC mains RMS voltage.

It is also known to those with some experience in designing regulation circuits for LEDs that there are still other instability effects due to the inductive and capacitive EMI filter components within a dimmer used for EMI suppression. These can interact with switching power supply circuits and cause undesirable flickering when an attempt is made to dim. These problems are particularly manifested at low light levels.

Furthermore, LEDs have certain non-linear characteristics which can cause anomalies when controlled by dimmers. That is, it is common to observe LED lamps snapping on or off at certain brightness levels rather than exhibiting a smooth full range of dimming. The proposed embodiment addresses this issue also.

It is known to those skilled in dimmer use or design that even with incandescent lamps there is a property of typical dimmer design which causes what is known as hysteresis. That is, if a dimmer is used to reduce the light to very dim and then off, the lamp will not come back on at the same point of potentiometer setting where it went off. The potentiometer will have to be increased to a substantially higher level, where the lamp will "pop" on. Again, those skilled in the art know that this hysteresis is due primarily to the dimmer employing what is known as a single-time-constant RC-timing circuit. Somewhat more expensive "double-time-constant" circuits can generally reduce but not eliminate this effect.

An undesired manifestation of such hysteresis occurs when a lamp is set to a low level and then the light switch is momentarily turned off and then back on. In such a case, the lamp would not come on and the dimmer would have to be adjusted higher until the lamp "pops" on and then the setting restored the lower desired level. When such a dimmer is used to control an LED lamp, the performance anomalies which exist even with an incandescent filament are exacerbated by the additional anomalies of the LEDs and LED driver power supply.

Several other issues should be noted here with respect to the challenge dimming of AC mains operated LED lamps and some of the techniques used to address the challenge.

For decades, it has been known to those skilled in the technology of LED lighting that there are many driver IC's available for the purpose of adjusting light levels, while maintaining power efficiency. Overwhelmingly, these driver IC's are powered by low-level DC voltages as might be found in typical digital circuits. These drivers most often use a method called pulse width modulation (PWM), a very well known technique.

However, these very popular methods and driver IC's are generally not useable in AC mains dimming because they require independent DC power supplies and apparently cannot be wired into a lamp circuit in any kind of practical way, aside from the economic considerations. This means that the world of LED lamp dimming is separated into two camps—DC circuit dimming and AC mains dimming.

Over the last several years, a number of IC makers have introduced chips which purport to facilitate dimming by supplying the necessary constant current power to the LEDs while not employing line voltage regulation. Some of these supply a constant DC current to the LEDs and provide a method to vary that current though an effect that mimics linear regulation. Those skilled in the art also know that a flyback power supply, using somewhat conventional IC's can be used to provide constant current to the LEDs while offering a degree of phase control dimming.

Other circuits use a form of LED current pulse width modulation similar to that noted for low voltage DC circuits, with the pulse width dictated by the dimmer setting. Still others employ a technique where the lamp employs circuits similar to those employed with fluorescent dimmers whereby a provision made for an external signal to cause pulse width modulation of the lamp. In this method, what is called a low voltage dimmer is employed. These approaches, offered by several major dimmer makers, such as Lutron and Leviton, typically require special wiring, an electrician, or both as well as being relatively costly.

Each of these methods can exhibit disadvantages in terms of meeting all of the desired performance objectives. Those which provide any kind of pulse width modulation of the actual LED current can cause the LEDs to operate at lessened efficacy because of the high peak-to RMS-ratio and it is known that LED efficacy starts to drop off at higher currents. The only way to offset this is to operate the LED's always at relatively low power—generally not the best economical use of the LEDs.

Other approaches, as used in the preferred embodiment, employ a form of pulse width modulation in one section of the power circuit, but the current to the LEDs, rather than being modulated to achieve variable brightness, is a constant DC level, which, to the LEDs, is tantamount to being linearly regulated.

Virtually all AC-mains, IC driver approaches, whether involving direct PWM of the LED current or constant DC current suffer from a number of well known issues associated with single-pole, phase control dimmers of the type dominating residential and commercial markets. It should be noted that these same issues exist in what are called digital or programmable single pole dimmers now in increasingly in the marketplace. These dimmers, using a microprocessor or other digital timing circuits rather than the traditional RC time constant circuit, still employ the triac as the basic switching device and the same type of EMI filter components.

A first issue relates to the EMI filter capacitor. In an ideal situation, the dimmer, as its phase angle is made smaller and smaller, provides a lower and lower RMS AC voltage to the LED driver (i.e., power supply) and a point is reached where there is insufficient voltage to operate the driver circuit and in turn power the LEDs. However, all dimmers employ an EMI filter capacitor typically between 0.047-0.1 mfd across the internal triac. Even when the dimmer is turned to a level which would cause a regular incandescent lamp to extinguish, the EMI capacitor in parallel with the triac creates an AC leakage path of typically about 33K to 50K ohms. That means power is being delivered to the power supply even when the dimmer is set to maximum potentiometer resistance. This characteristic of virtually all dimmers prevents the LED lamps from being dimmed quite low.

However, incandescent lamps are still "on" even when the filament is heated below incandescence. So when the leakage current is still powering the lamp, the filament is on but not emitting light. With LEDs there is no such "powered on but no light" stage. It is either on or it is not. In a rather high-powered LED lamp, incorporating many LEDs, this leakage current can result in substantial undesired illumination.

A means can be incorporated to offset this problem.

A second issue relates to the EMI filter inductor. The dimmer virtually always incorporates an EMI filter inductor. This inductor, in conjunction with parasitic capacitance, can create circuit "ringing". When the dimmer is set to very low light levels, these bursts of oscillation can interfere with the voltage to the driver IC, and, occurring every 8 milliseconds, can interfere with the attempts by the driver IC to stay in a stable mode. The result is flickering. Just as the EMI capacitor can create undesired leakage current, the EMI inductor can cause flickering.

A further means can be incorporated to offset this problem.

A third issue relates to other causes of inadequate or unstable supply voltage to the driver IC. As the input voltage is reduced more and more, the voltage source for the driver IC can become unstable. Most driver ICs intended for AC-mains operation, incorporate what is called an "undervoltage lock-out" circuit. This is a safety circuit which prevents the IC from drawing too much current and overheating if the input voltage gets too low. As a result, when the input voltage is reduced via the dimmer, the IC may want to shut itself off well before the LEDs have reached the desired low level. This will cause the LEDs to dim down to only perhaps the 20-40% level and suddenly go off.

A still further means can be incorporated to minimize or eliminate this issue.

A fourth issue relates to LED non-linearity. Unlike an incandescent lamp filament, a series string of LEDs does not start conducting current as soon as voltage is applied. Current does not start until the voltage level exceeds the cumulative conduction thresholds of all the diodes, typically about 2.5V for an individual diode. For example, that would mean a series string of 10 diodes would require that voltage be above about 25 volts before current can start. Similarly, when the LEDs are on and being dimmed by a reduction in voltage, the LED current will cease entirely before voltage drops much below 25 volts.

A full discussion of switching power supplies and duty cycle control will not be appropriate here but suffice it to say the ability of a switching power supply to decrease output power to near zero depends on the degree to which the duty cycle can be reduced to near zero.

As a practical matter, all driver ICs have a limit as to how much their duty cycle and/or one-time pulse width can be reduced. This means that as an attempt to dim the LED string takes place, the duty cycle gets less and less but at a certain point, called for by the adjustment potentiometer, the IC can become non responsive, with the result that the LED current suddenly drops to zero or flickers. Similarly, when voltage is being increased from zero, the driver IC is unable to respond properly until an appropriate input voltage is reached, at which time the LED illumination can suddenly jump from zero to a finite brightness level.

This discontinuity in the way LEDs respond to a variable input voltage can be exacerbated by the previously noted lamp dimmer hysteresis. This means we have three factors—dimmer hysteresis, driver-IC duty cycle, and LED conduction-threshold effects—all contributing to the tendency of an LED string to "pop on" and "pop off" rather than exhibiting smooth adjustability down to zero and up from zero.

These deficiencies can be in evidence in varying degrees depending on the specific driver IC, number of LEDs in the string or LED operating current A means can be incorporated to eliminate this issue.

A fifth issue relates to the RC time constant within the dimmer. Each half cycle before the triac triggers, the capacitor in the timing circuit begins to charge through two resistances: the resistance of the adjustment potentiometer and the resistance of the lamp filament. That is, the two resistances are effectively in series and constitute the net charging resistance. During the half cycle, if any additional impedance is introduced into the RC timing function, the dimmer can skip cycles, resulting in erratic control or even flickering. Unless the power supply circuit takes this into account, the current drawn by the power supply during the pre-trigger portion of the half sine wave, if not sufficient, can represent such an additional undesired impedance and cause flickering at low dimmer settings.

A still further means can be incorporated to eliminate this issue.

A sixth issue relates to line voltage variations. In any AC mains lighting situation, the line voltage might vary from 90 to 130 volts depending on time of day or year and geographical location. Such a significant line voltage variation can result in an adverse effect on certain operating characteristics of the chosen dimmable driver circuit which are intended to activate or deactivate at specific points in the voltage sine wave. That is, the instantaneous line voltage may have specific amplitude at a 60-degree phase angle if line voltage were 90VAC but instantaneous amplitude much higher at that same phase angle if line voltage were 120VAC. This could result in inconsistent lamp performance for various line voltages.

A still further means can be incorporated to eliminate this issue

A seventh issue relates to methods to appropriately load the dimmer to achieve stability. There is substantial prior art suggesting how the triacs within dimmers have certain holding currents and that such dimmers will not work properly if lamps of low wattage are used. Many makers of the new digital dimmers routinely note that their dimmers might not work properly below certain wattages. Prior art shows how certain "preload" circuits can be employed to overcome this aspect. However, preloads can significantly degrade overall lamp efficiency and cause operating anomalies if not implemented appropriately.

A still further means can be incorporated to eliminate this issue.

An eighth issue relates to lamp self-protection in the event the lamp is operated in an extremely hot environment. It is the intent of proposed embodiments to employ a circuit architecture whereby the lamp automatically self-dims in the presence of excessive ambient temperature so that light level and power are smoothly reduced to where equilibrium is reached and lamp elements are safe.

A still further means can be incorporated to address this issue.

Figure 1:
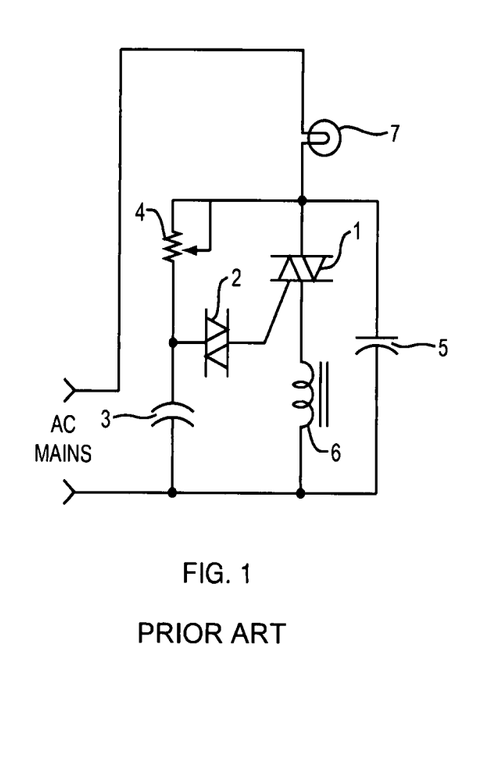
FIG. 1 shows a typical prior art dimmer circuit with incandescent lamp.

In FIG. 1 is shown a standard dimmer circuit, having a main triac switching element, 1, a trigger diode 2 a charging capacitor 3 a series charging resistance 4, an EMI filter capacitor 5 and an EMI filter choke 6. In practice, the capacitor 4 charges toward the instantaneous line voltage each half cycle with the charging time being adjustable by means of the potentiometer 3. When the capacitor is charged to typically about 32 volts, the threshold of trigger diode 2 is reached, the diode triggers and on the basis of its negative resistance characteristic, discharges the capacitor thought the gate of the triac 1 and full lamp current commences. This circuit is driving a conventional incandescent lamp 7.

Figure 2:
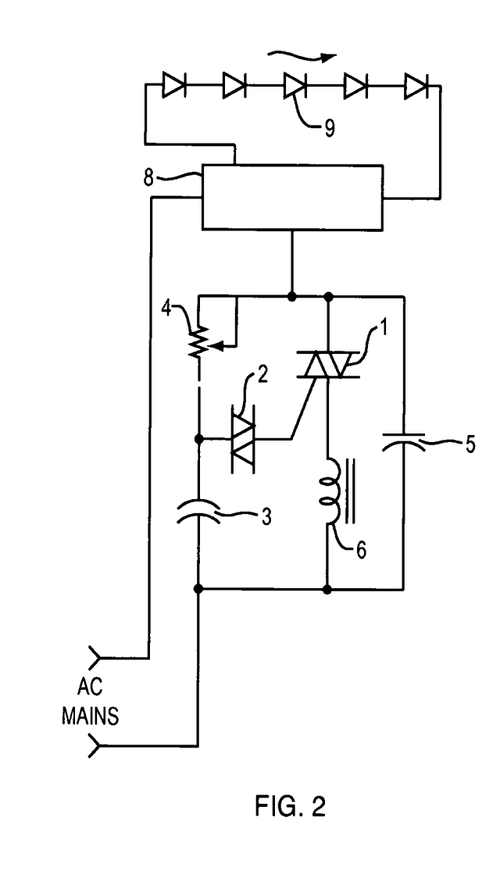
FIG. 2 shows a circuit that is similar to the circuit of FIG. 1, but with an LED lamp.

In FIG. 2 is shown the same circuit except that the load is a power supply (8) and LED series string 9. Consequently, there is not necessarily a fixed impedance such as the filament to complete the charging path and the capacitor, as a result, may not charge to the intended value. The preference is to have a known fixed resistance between the top of the potentiometer and the other side of the line, to take place of the filament.

The capacitor 5, being across the triac, acts as a constant impedance between the AC voltage and the lamp filament of FIG. 1, resulting for example of approximately 4 mA of AC leakage current flowing even when the triac is off. For an AC filament, this is not enough to cause illumination, but for a power supply powering low-wattage LED lamps, as in FIG. 2, the 4 mA at 120VAC constitutes nearly a watt and can easily result in substantial LED illumination even when the dimmer is set to a level which should result in no illumination.

One can also see the EMI filter inductor 6 in series with the triac. When the triac switches on each half cycle, this inductor can result in some ringing (i.e., some parasitic circuit oscillations. With an incandescent lamp, these parasitic oscillations are of no consequence because of the significance thermal inertia of the filament. However, when a switching power supply and LED load is involved, such parasitic oscillations can cause erratic operation of the power supply at low light levels. Multiple parasitic oscillations can result with the effects being manifested as LED flicker. The LEDs, having no thermal inertia, respond immediately to any oscillatory variations in current and any such oscillatory variations below about 40 Hz will show as flickering, While very high frequency oscillations might not be visible, what often happens is that the switching power supply may momentarily turn on and off at a rate low enough for the corresponding variations in light to be visible.

Figure 3:
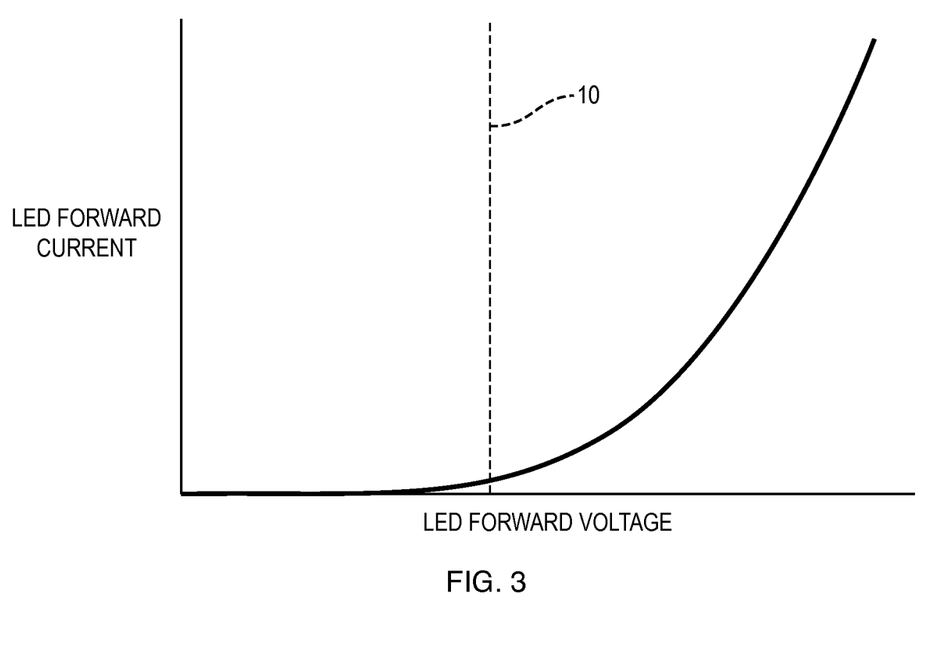
FIG. 3 shows LED voltage-current characteristics.

FIG. 3 shows a typical voltage-current characteristic of a single LED or an LED string. The current in a single device or a multiple of devices does not start flowing until a certain threshold 10 is reached and then the current starts to rapidly increase In a non-linear manner resulting in destruction if there were not some kind of limiting circuitry known as a ballast in fluorescent lamp circuits but simply as an LED driver among LED lamp technologists.

This nonlinear property of the LED causes performance anomalies in LED circuits employing driver ICs. These anomalies to a great degree relate to the driver IC's inability to operate as desired under no-load or extremely light-load conditions or to respond quickly enough when the load constantly "appears and disappears."

This is a limitation of all driver IC's that is well known in the power supply industry. For conventional power supplies, many techniques have been developed to overcome these limitations, but at a cost of size, efficiency or complexity. In an LED lamp, there simply is not the latitude to employ the same techniques or at least employ them in the same way.

The three aforementioned issues are all related to the fact that the dimmer and power supply would both like to have fixed resistive loads, but such is not the case. It is known in the art that the placement of what are called preloads across the AC line can mitigate the leakage current and oscillatory effects of the dimmer capacitor and inductor. What is generally not addressed is the need for similar preloads across the LED string so that the power supply is always working into a fixed load when at low duty cycle, where all instability problems occur.

Prior art has shown preload techniques where the preload is connected during low phase angles but disconnected at higher phase angles. Such prior art circuits are typically complex, inefficient or both. Moreover it is not simply enough to have preload input or output circuits and switch them in or out at certain phase angles. To do so may create totally unacceptable jumps or dips in light output. With installations involving multiple lamps, the various lamps could be observed to be jumping up or down in brightness at different points as the dimmer dial is turned because no two circuits, unless synchronized. Could operate exactly the same because of component tolerances.

Figure 4A:
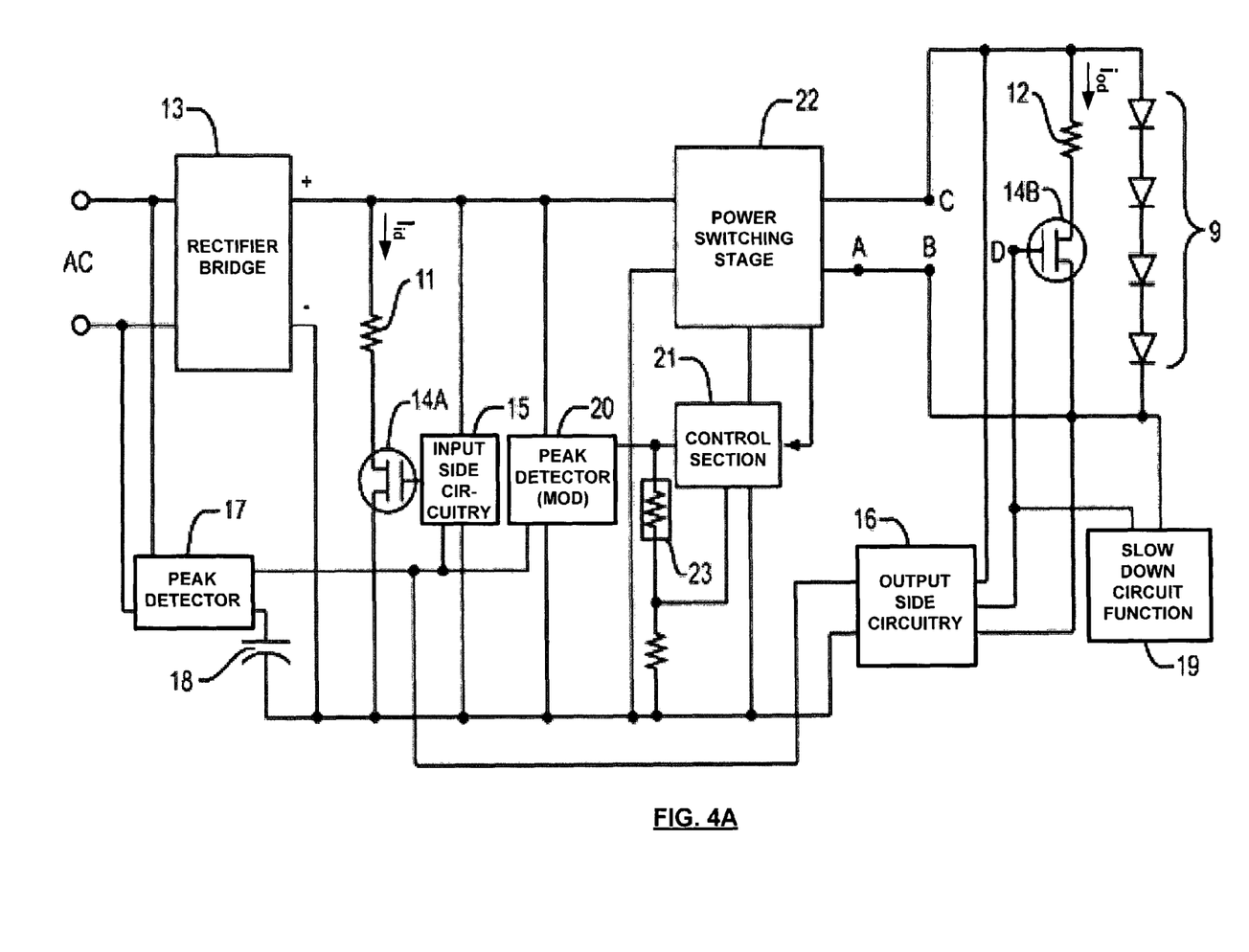
FIG. 4A shows a power supply circuit.

In FIG. 4 is shown a simplified diagram of the power supply showing an input preload resistance 11 across the rectifier bridge 13 and an output preload resistance 12 across the LED string 9 each of these resistances has a MOSFET 14 switch in series with it, to divert currents $i_{di}$, $i_{do}$ through them.

Additional circuit sections 15 and 16 cause each of the MOSFETs to be normally on just before one would expect the AC RMS voltage to have been adjusted upward to where it is adequate to result in the LEDs beginning to illuminate. The two circuits 15 and 16 might each typically consist of a preload resistor in series with a MOSFET used as a switch, connecting or disconnecting the associated preload resistor. The result is that the effects of the dimmer capacitor and inductor are offset and similarly the power supply can operate at startup into a resistive load sufficient for a stable duty cycle.

The block 17 is a rectifier filter acting as what is known as a peak-detector stage. (See www.allaboutcircuits.com/vol 3/chpt 3/5.html). An appropriate capacitor 18 placed across the output of this stage, if loaded with a specific impedance, will generate a DC voltage level proportional to the phase angle at which the dimmer triac triggers. In other words, the output of the peak detector can be used as a very simple phase angle detector, generating a signal which can be used to turn off the input MOSFET preload circuit and at the same time optically couple the same signal so as to turn off the output preload MOSFET.

Referring to FIG. 5, in a typical phase control dimming application, the sine wave amplitude is zero for period and then suddenly jumps up to a higher point each half cycle when the triac turns on. FIG. 5a depicts the AC mains sinusoidal waveform. If the dimmer were set to about 80-90% brightness and turned on at about 30 degrees, as shown in FIG. 5b, the peak voltage will still be the same as when there is a full sine wave.

Figure 5A:
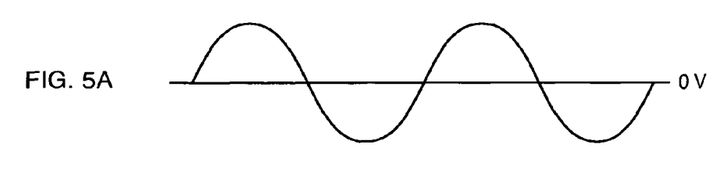
FIG. 5A is a diagrammatic waveform plot of the AC mains sinusoidal wave for the circuit of FIG. 1.
Figure 5B:
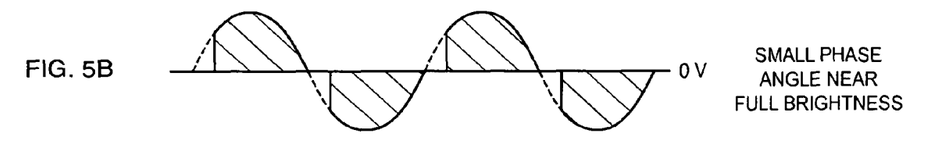
FIG. 5B is a diagrammatic waveform plot of the AC mains sinusoidal wave for the circuit of FIG. 1 with a small phase angle near full brightness.
Figure 5C:
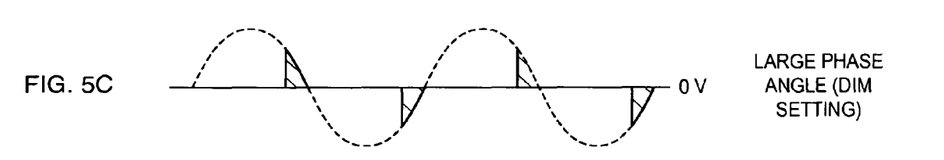
FIG. 5C is a diagrammatic waveform plot of the AC mains sinusoidal wave for the circuit of FIG. 1 with a large phase angle dim setting.
Figure 5D:
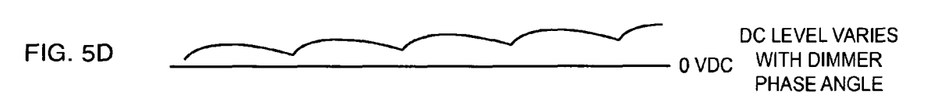
FIG. 5D is a diagrammatic output waveform for the output of FIG. 1.
Figure 5E:
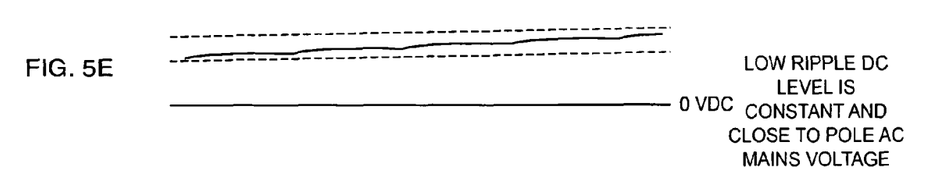
FIG. 5E is a diagrammatic output waveform for the output of FIG. 1 in a highly dimmed state.
Figure 5F:
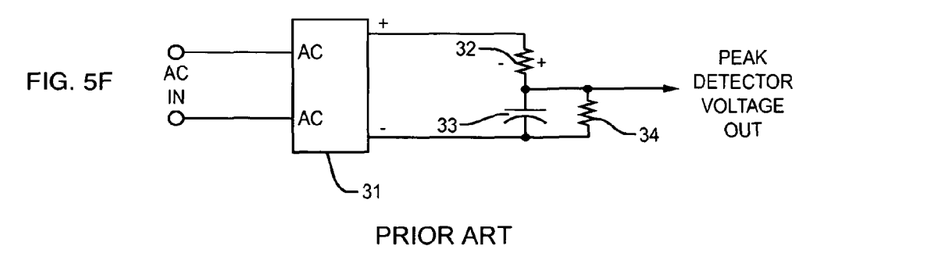
FIG. 5F is a circuit diagram for an embodiment of a peak detector for the circuit of FIG. 4A.

The peak detector holds this peak voltage. With a peak detector embodiment as shown in FIG. 5f, the output capacitor 33 charges through a resistor 32 and essentially stays charged almost to peak line voltage. This is the case even with a highly dimmed stage, as shown in FIG. 5e, because there is a high impedance discharge path.

In an actual circuit, one can put a small load resistor 34 on the peak detector capacitor so that the capacitor purposely does not track exactly track the peak line voltage but reflects a combination of the peak voltage and the RMS voltage. In other words, by loading down the peak detector with a resistor, one can cause its output to droop and create a lower average DC output level as in FIG. 5d which is then reflective of the phase angle. The size of the capacitor 33 and the charging resistor 32 and used to optimize these effects.

Additional threshold circuitry associated with the peak detector 15 can determine exact peak detector DC level at which the MOSFET 14 will turn on or off. This results in the MOSFET 14A and preload resistor 11 coming into play at a phase angle determined by how one sets the threshold of the peak detector 15. Those skilled in the art will recognize that such thresholds can be set in different ways, such as by means of zener diode or IC comparator functions.

Figure 4B:
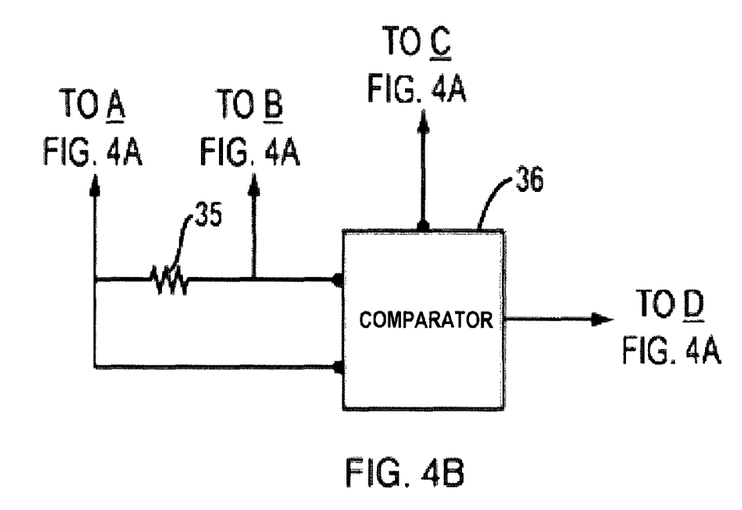
FIG. 4B shows an alternative insert for the power supply circuit of FIG. 4A.

The output side circuitry 16 controls the output preload MOSFET 14b just as the input circuitry 15 controls the input MOSFET 14A. In FIG. 4, there is shown a direct connection from the output of the peak detector 17 to the output MOSFET control circuit 16. The output circuit 16 preferably incorporates and opto-coupler so that the signal from the peak detector can be coupled to the output preload circuitry without being concerned for proper ground references between input and output sides of the power supply.

Where such ground references or use of opto-coupler is not desired, the output reload switching can be achieved by an alternate arrangement shown in simplified manner in FIG. 4. The control circuit 16 is not used. Instead a current sense resistor 35 is inserted between points A and B instead of a direct connection. The LED current is always passing through this resistor. The signal developed across the resistor is sent to a comparator circuit 36 and the output of that comparator is in turn sent to the gate of the MOSFET 14B. The comparator output will change levels at a certain current through the resistor 35. This means that the preload resistor 12 will be disconnected at a desired level of LED current.

In actual practice, Turning off the preload at a prescribed average LED current level has the same effect as turning off at a prescribed phase angle. Different overall lamp purposes may dictate when one technique might be preferable to the other.

The purpose of turning off the two preloads is so that there is zero preload power loss at higher or full power light levels, in turn ensuring that the lamp is operating at maximum efficiency at high light levels. Employing these switchable preloads does not completely address the problem. Just switching out the preload at some moderate light level can result in very undesirable jumps or drops in light levels. For example, if the lamp were operating at 20% brightness at the point of preload switch-out, the power supply, being a constant current source for any given input voltage, would attempt to maintain the same current level. This means that if the load which had been the sum of the LED current and the preload current, were now changed to only the LED current, the LED current would have to immediately increase to make up the difference, resulting in a jump in brightness.

To make this preload switch-out happen without an obvious viewer perception of it requires that it occur smoothly and relatively slowly over several seconds. Consequently, a circuit function 19 is added to greatly slow down the charge and discharge of the MOSFET capacitance so that the transition of MOSFET from high to low impedance or vice versa, occurs in many seconds instead of micro- or milliseconds.

In the simplest form, one can place substantial impedance in series with the gate of the MOSFET 14B. MOSFETs have gate capacitance and that capacitance should be charged by a signal before the device can turn on. If the RC time constant is long (the C of the MOSFET gate and the R in series with the signal input), the MOSFET can be made to turn on in seconds instead of microseconds. Similarly, to turn off, a MOSFET must have its gate capacitance discharged by an appropriate resistance between the gate and source terminal. By a proper balancing of the series R of charging and the shunt R of discharge (balancing of the two time constants in conjunction with the dynamic turn-on and turn-off characteristics of the MOSFET), one can cause the MOSFET to turn on very slowly and turn off very slowly, even over several seconds.

Such very slow switching of MOSFETS could seem counter-intuitive since MOSFETs are thought of as ultra-high-switching-speed devices. It should be noted that those skilled in the art would be expected to understand that in power supply circuits it is extremely desirable to cause MOSFETs to switch on or off at the very highest speeds, typically in hundreds of nanoseconds so that switching losses are minimized. Switching a MOSFET from a high-current/low-voltage state to a high-voltage/low-current state can cause it to dwell for too long in a medium-voltage/medium-current state and be destroyed by excessive dissipation. In this embodiment, the LED string voltage and preload current levels are such that the dissipation caused by the intermediate voltage and current during slow switching is tolerable. As a result, the MOSFET type is chosen to be able to safely handle the few watts encountered during the switching interval.

It should be noted that there is a further distinction from the invention herein regarding the approach to preloading. Substantial prior art in this regard typically employs techniques to activate a preload during a portion of each half cycle and disconnect it during a latter portion of the half cycle.

It is a premise of this invention that such approaches are still vulnerable to instabilities during certain modes of dimming and for certain loads and that such approaches can be more complex and costly if such vulnerabilities are to be eliminated. Consequently, the invention applies switchable preloads not on the basis of the instantaneous phase angle each half cycle, as in Brown, U.S. Pat. No. 7,102,902, but rather the setting of the dimming potentiometer. It should also be noted that the Brown patent teaches that output (LED) side preloading is ineffective or not feasible. Such assumed difficulty is overcome in this embodiment. That is, the invention takes a "long look" at the dimmer setting and "decides" whether to have the preload or not. In this manner the lamp is maintained in a very stable mode at lower light levels.

The power supply circuit also includes a second, slightly modified peak detector circuit 20 similar to that earlier noted 17 used for phase angle detection. Normally the driver circuit is connected to the DC bus represented by the plus output of the rectifier 13, This connection allows a reference voltage to be created which plays a part in varying the driver chip duty cycle so as to create a dimming effect. However, when a dimmer is set to a low level, as shown by FIG. 5c, the driver chip still has appropriate voltage to perform some of its functions but that secondarily developed referenced voltage becomes unstable because of excessive noise superimposed on it by the transients caused by the firing of the triac.

This "contamination" of the reference voltage is particularly important as the duty cycle of the driver IC gets close to its limit as it does in low brightness setting. To ensure that the reference voltage remains stable even with the lower and increasingly contaminated DC bus voltage, the driver IC is made to receive its reference voltage not from the noisy bus voltage but rather from the peak detector 17, as buffered by some additional circuitry 20. In practice, the peak rectified and capacitively filtered output of 17 is more stable and noise free than the DC bus side of the rectifier 13.

The instability of all LED driver IC's at low line voltages, particularly if those low line voltages are represented by phase controlled sine waves and the attendant severe parasitic noise, has been a major obstacle to being able to dim string of LEDs down to zero or near brightness and back up without any evidence of flicker. Such flicker can be eliminated even without this peak detector augmentation, if highly dissipative preloads are used. The preferred embodiment simplifies the design and makes the preload approach and enhancement but not as critical. In other words, the use of the peak detector augmentation for generating the reference voltage, coupled with the preload approach, allows a design methodology applicable to LED lamps in a way independent of power level.

In the power supply, the control section 21 contains a driver IC and associated components to set its operating conditions. The driver IC is essentially a flip flop oscillator whose duty cycle determines the average current supplied to the LEDs. The duty cycle is set by a predetermined reference voltage which is compared with a signal generated by a current sense resistor in series with the LED current. This constant comparison forces the duty cycle to automatically adjust to keep the LED current at the desired constant level as set by the reference voltage.

When line voltage is reduced, the reference voltage, whose baseline value is set for normal full line voltage, changes, and this causes the LED current to move to a different lower level.

The output of the control stage is directed to the power switching stage (22), which is the main section of what is called, in this case, a buck regulator. Buck regulator design has been well understood for decades. Basically, such a circuit contains a switching transistor, inductor and free-wheeling diode and a filter capacitor. The transistor switches on and off and current rises and falls in the inductor and load as a function of the frequency of switching, the load impedance and the size of the inductor. The objective is to maintain a constant DC current in the load. In practice this is reasonably achieved with the amount of rise and fall of current described as "ripple," a characteristic determined to a large degree by the value and high frequency impedance of the filter capacitor.

Figure 6:
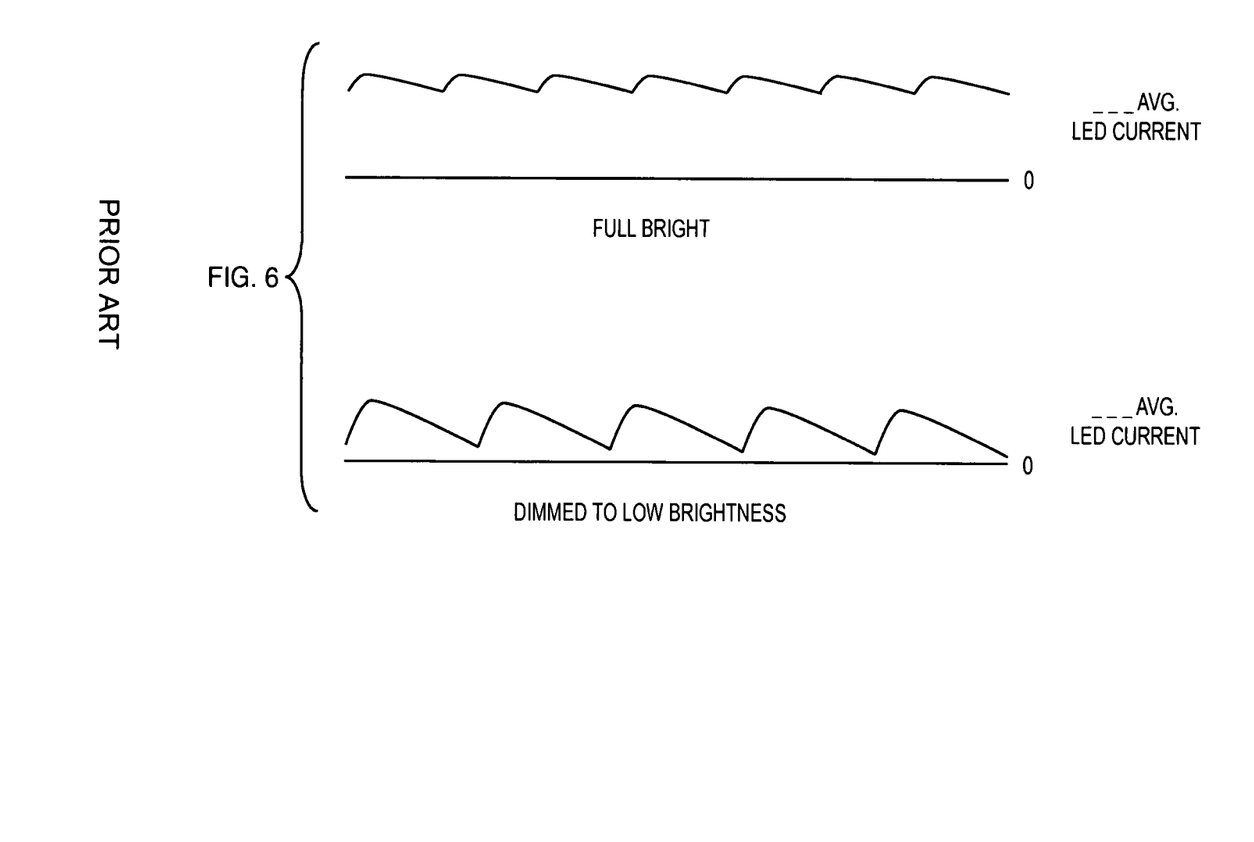
FIG. 6 is a diagrammatic waveform plot of output levels for the dimmer circuit of FIG. 1.

FIG. 6 shoes a typical LED current waveshape under conditions of low and high brightness. At low brightness, duty cycle decreases and it becomes more difficult for the inductor and/or filter capacitor to maintain a constant, low ripple, DC current but in the case of an LED lamps, that is typically not an issue at lower brightness levels.

If the LED current were to have very high ripple at full brightness, that could impair LED "efficacy". Efficacy is the figure of merit for LEDs in terms of light output (lumens) per watt. At certain higher currents LEDs begin to have significant degradation of efficacy. In an advanced LED lamp, one typically wants to operate the LEDs near the point where such degradation would become meaningful.

Many LED dimming schemes, describe how one can dim with 100% pulse width modulation (the LED going completely off and then on) and allowing the duty cycle to set the average brightness. However such schemes, in order to achieve the average brightness of a lamp of this embodiment (having near constant DC at full brightness) would have to have the LED current increasing to more than double its average value when on. This means that the LED would be forced into its lower efficacy state every time it is one. Consequently such 100%-modulation methods, even though often described and recommended in technical articles, tend to result in sub-optimal results in general illumination applications where efficacy is very important.

This embodiment is based on a buck regulator topology but it is possible to replace the main power switching stage with other types of circuits, such as an isolated transformer and an approach known as a flyback power supply. Such an approach has long been well understood in the art. Appendix A summarizes the principles involved and such an approach is commonly thought of as basically replacing the choke of the buck regulator with a transformer. Such isolated flyback methods, while typically less efficient than a buck regulator and slightly more complicated can have advantages under certain specialized applications where electrical isolation is mandatory. In such situations, the principles of this invention could be applied by persons skilled in the art.

Finally, the power supply dimming circuit has a provision for being responsive to temperature. In FIG. 4 is shown a thermistor 23. It is connected in such a way as to simulate the reduction of phase angle by an external dimmer and the resultant decrease in input RMS voltage. It is known in the art that there are positive temperature coefficient (PTC) and negative temperature coefficient (NTC) thermistors. It is further known that there are two types of PTC thermistors: those typically employing silicon material to create the resistance and having a linear response to temperature; and those employing a ceramic material and exhibiting a very non-linear response to temperatures above a prescribed temperature.

With the latter type, the increase in resistance is so significant (going from low to high resistance) that it is said to "switch'". For example, such a PTC thermistor may increase by a factor of 10,000 over a range of only 20-30 degrees C. While it does not actually switch from low to high impedance very sharply as might a mechanical thermostat or solid state switch, it can be used effectively to limit power in a controlled manner. In this suggested embodiment, the choice of thermistor baseline resistance and its temperature changing properties are chosen so that it effectively serves to automatically dim the LEDs by an appropriate amount if lamp temperature becomes excessive. An equilibrium condition is achieved whereby the final light level allows the lamp to operate safely regardless of the temperature conditions. The circuit placement of the thermistor is such that external dimmer function continues to be normal.

The present invention has now been described in connection with a number of specific embodiments thereof. However, numerous modifications which are contemplated as falling within the scope of the present invention should now be apparent to those skilled in the art. For example, a variety of equivalent circuit substitutions can be made without changing the underlying purposes of the circuit. Functions can also be combined to achieve a different circuit breakdown, and some functionality may not be necessary in all embodiments. And digital, processor-based techniques could also be used to implement circuit functionality where appropriate. It is therefore intended that the scope of the present invention be limited only by the scope of the claims appended hereto. In addition, the order of presentation of the claims should not be construed to limit the scope of any particular term in the claims.

What is claimed is:

1. A method of providing power to an LED, comprising:
   receiving AC power with a variable duty cycle,
   rectifying the AC power,
   converting the rectified power to DC power using a power conversion circuit that has a DC output,
   providing the converted power from the DC output of the power conversion circuit to an LED,
   detecting when the duty cycle of the received AC power falls below a predetermined level, and switching at least some of the converted power from the DC output away from the LED through a circuit path separate from the conversion circuit used in the step of converting in response to the step of detecting when the duty cycle of the received AC power falls below a predetermined level.

2. The method of claim 1 wherein the step of switching power takes place intermittently during only a portion of each phase of the duty cycle.

3. The method of claim 1 wherein the step of switching is performed by a MOSFET switch.

4. The method of claim 1 wherein the step of detecting is performed by a phase detector.

5. A method of providing power to an LED, comprising:
receiving AC power with a variable duty cycle,
rectifying the AC power,
converting the rectified power to DC power using a power conversion circuit that has a rectified power input and a DC output,
detecting when the duty cycle of the received AC power falls below a predetermined level,
switching at least some of the rectified power away from the rectified power input of the conversion circuit through a circuit path separate from the circuit path in the power conversion circuit used in the step of converting, in response to the step of detecting when the duty cycle of the received AC power falls below a predetermined level, and
providing the converted power to an LED from the DC output of the power conversion circuit.

6. The method of claim 5 wherein the step of switching power takes place intermittently during only a portion of each phase of the duty cycle.

7. The method of claim 5 wherein the step of switching is performed by a MOSFET switch.

8. The method of claim 5 wherein the step of detecting is performed by a phase detector.

* * * * *